(12) United States Patent
Lee et al.

(10) Patent No.: US 7,184,409 B2
(45) Date of Patent: Feb. 27, 2007

(54) BLIND RATE DETECTION METHOD AND DEVICE IN ASYNCHRONOUS MOBILE COMMUNICATION SYSTEM

(75) Inventors: Yong-Su Lee, Daejeon (KR); Youn-Ok Park, Daejeon (KR); Seung-Chan Bang, Daejeon (KR); Eui-Hoon Jeong, Daejeon (KR); Ik-Soo Jin, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 923 days.

(21) Appl. No.: 10/133,418

(22) Filed: Apr. 29, 2002

(65) Prior Publication Data

US 2003/0108011 A1 Jun. 12, 2003

(30) Foreign Application Priority Data

Dec. 6, 2001 (KR) ............................... 2001-76934

(51) Int. Cl.
*H04B 7/216* (2006.01)
(52) U.S. Cl. ..................... 370/252; 370/335; 370/342
(58) Field of Classification Search ................ 370/252, 370/253, 335, 342; 375/341; 714/795
See application file for complete search history.

(56) References Cited

U.S. PATENT DOCUMENTS

| 5,509,020 A * | 4/1996 | Iwakiri et al. ............... 714/704 |
| 7,010,001 B2 * | 3/2006 | Odenwalder ................ 370/476 |
| 2001/0055334 A1 * | 12/2001 | Tiedmann et al. ........... 375/225 |
| 2003/0014456 A1 * | 1/2003 | Nagata et al. .............. 708/517 |

OTHER PUBLICATIONS

3$^{rd}$ Generation Partnership Project; Technical Specification Group Radio Access Network; Multiplexing and channel coding (FDD) (Release 1999). 3GPP TS 25.212 v3.4.0. Sep. 2000. pp. 56-58.*

* cited by examiner

*Primary Examiner*—Derrick W. Ferris
(74) *Attorney, Agent, or Firm*—Mayer Brown Rowe & Maw LLP

(57) ABSTRACT

A blind rate detection method in an asynchronous mobile communication system comprises: restoring data when a path selection (PS) value at a last bit's possible position satisfies a PS condition; determining whether a SER satisfies a SER condition when no error occurs in a CRC; determining whether to update a minimum value of PS values when the SER satisfies the SER condition; setting a PS value of the last bit's possible position as the minimum value of the PS values and the last bit's possible position as a last detection position when updating the minimum value; and repeating the above steps until the last bit's possible position reaches a maximum value, and outputting the last detection position when the last bit's possible position becomes the maximum value.

11 Claims, 4 Drawing Sheets

BLIND RATE DETECTION METHOD AND DEVICE IN ASYNCHRONOUS MOBILE COMMUNICATION SYSTEM

CROSS REFERENCE TO RELATED APPLICATION

This application is based on Korean Patent Application No. 2001-76934 filed on Dec. 6, 2001 in the Korean Intellectual Property Office, the content of which is incorporated herein by reference.

BACKGROUND OF THE INVENTION (a) Field of the Invention

The present invention relates to a blind rate detection method and device in an asynchronous mobile communication system. More specifically, the present invention relates to a blind rate detection method and device in an asynchronous mobile communication system with simpler hardwired implementation and improved reliability.

(b) Description of the Related Art

In general, a transmitter in an asynchronous mobile communication system performs a channel encoding process and a modulation process on blind rate data to transmit them to a receiver via a radio channel.

The receiver receives the blind rate data from the transmitter through the radio channel, a demodulator demodulates them, and a Viterbi decoder performs a decoding process on them.

In this instance, a transmission speed of input data must be previously known in order for the Viterbi decoder to decode symbols of the received data.

Transmission speed information of image data or control signals but not speech data is transmitted to the decoder through various paths, for example, an additional channel or a transport format combination indicator (TFCI).

However, in the case of the speech data, blind rate information is not previously transmitted to the decoder. Therefore, in order to determine various speeds transmitted by the transmitter, the Viterbi decoder uses information such as a cyclic redundancy code (CRC) check to determine a transmission speed. Hence, in the case there is no TFCI, the asynchronous IMT-2000 system requires an algorithm for detecting a blind rate, that is, a blind transport format detection (BTFD) algorithm.

A conventional BTFD algorithm for detecting the blind rate is represented in FIG. 1, but prior to describing the BTFD algorithm, a data structure that has a blind rate will be described with reference to FIG. 2.

Referring to FIG. 2, the variable length data stream undergoes block encoding and convolutional encoding using a CRC, and CRC parity bits are provided at the end of the variable length data stream in a reverse order. The receiver is notified of a transmittable format or a last bit's possible position $N_{end}$, which can be plural, and it is now restricted to nine positions, each of which is defined to be 39, 42, 49, 55, 58, 61, 65, 75, and 81.

First, various parameters needed for detecting the blind rate are reset in step S101. Here, the parameters include a last bit's possible position $N_{end}$, a minimum value $S_{min}$ of path selection values, and a last detection position $N_{detected\_end}$. The last bit's possible position $N_{end}$ and the last detection position $N_{detected\_end}$ are reset to be 1, and the minimum value $S_{min}$ of the path selection values is reset to be a path selection threshold value $TH_{path-selection}$ that is previously set as a predetermined value.

Next, Viterbi decoding is performed, and an accurate trellis path is terminated in the 0 state at the last bit's possible position $N_{end}$ in step S103. In this step, the Viterbi decoder performs add, compare, and select operations (i.e., ACS) to generate a maximum path metric value $a_{max}$, a minimum path metric value $a_{min}$ at the last bit's possible position $N_{end}$, and a path metric value $a_0$ in the 0 state.

Next, a path selection value $S(N_{end})$ at the last bit's possible position $N_{end}$ is found by Equation 1 in step S105.

$$S(N_{end}) = 10\log\left(\frac{a_{max}(N_{end}) - a_0(N_{end})}{a_{max}(N_{end}) - a_{min}(N_{end})}\right) \quad \text{Equation 1}$$

Next, in order to remove the generation of a detection error, it is determined whether the path selection value $S(N_{end})$ at the last bit's possible position $N_{end}$ is equal to or less than the path selection threshold value $TH_{path-selection}$ in step S107. That is, according to the path selection threshold value $TH_{path-selection}$, it is determined whether the trellis path connected to the 0 state is to be traced back to the last bit's possible position $N_{end}$.

If the path selection value $S(N_{end})$ fails to satisfy Equation 1, that is, when the path selection value $S(N_{end})$ is greater than the path selection threshold value $TH_{path-selection}$, it is determined whether the last bit's possible position $N_{end}$ is a maximum value in step S119. When the last bit's possible position $N_{end}$ is not the maximum value, the last bit's possible position $N_{end}$ is increased by 1 in step S121, and the steps S103, S105, S107, and S119 are repeated so that the last bit's possible position $N_{end}$ may be the maximum value, that is, 81. Accordingly, when the last bit's possible position $N_{end}$ is the maximum value, the maximum value is output to the last detection position $N_{detected\_end}$ in step S123.

When the path selection value $S(N_{end})$ satisfies Equation 1, that is, when the path selection value $S(N_{end})$ is less than or equal to the path selection threshold value $TH_{path-selection}$, its path is traced back from the last bit's possible position $N_{end}$ so as to restore frame data in step S109.

Next, the CRC parity is calculated from the restored data in step S111, and a CRC check is performed in step S113.

If a CRC error occurs in the CRC check step S113, the step S119 is executed, and if no CRC error occurs, it is determined in step S115 whether the path selection value $S(N_{end})$ at the last bit's possible position $N_{end}$ is less than the minimum value $S_{min}$ of the path selection values reset in the reset step S101.

In this instance, when the path selection value $S(N_{end})$ is equal to or greater than the minimum value $S_{min}$ of the path selection values, the step S119 is executed, and if the path selection value $S(N_{end})$ is less than the minimum value $S_{min}$ of the path selection values, the path selection value $S(N_{end})$ of the last bit's possible position $N_{end}$ is stored as the minimum value $S_{min}$ of the path selection values, the last bit's possible position $N_{end}$ is stored as the last detection position $N_{detected\_end}$ in step S117, and the step S119 is executed.

As described, the conventional blind rate detection algorithm uses a logarithmic function as shown in the previous step S105, and since it is very complicated to implement the logarithmic function in hardware, the hardware requires an unnecessarily large amount of storage.

Further, when the CRC check is passed in the previous step S113, the path selection value $S(N_{end})$ of the last bit's possible position $N_{end}$ is routinely compared to the minimum value $S_{min}$ of the path selection values, and hence, the last detection position $N_{detected\_end}$ cannot be accurately found under a very bad channel environment.

SUMMARY OF THE INVENTION

It is an object of the present invention to provide a blind rate detection method and device in an asynchronous mobile communication system for easy hardware implementation, and for outputting reliable results under a bad channel environment.

In one aspect of the present invention, a blind rate detection method in an asynchronous mobile communication system comprises: a) restoring data when a path selection value at a last bit's possible position of a reset last bit satisfies a predetermined path selection condition; b) determining whether a symbol error rate (SER) of the restored data satisfies a predetermined SER condition when no error occurs in a cyclic redundancy code (CRC) of the restored data; c) determining whether it is needed to update a minimum value of path selection values when it is determined that the SER satisfies the predetermined SER condition; d) setting a path selection value of the last bit's possible position as the minimum value of the path selection values and setting the last bit's possible position as a last detection position when it is determined that it is needed to update the minimum value of the path selection values; and e) repeating the steps of a) to d) until the last bit's possible position reaches a predetermined maximum value, and outputting the last detection position when the last bit's possible position becomes the predetermined maximum value.

The step a) comprises: 1) calculating a branch metric value up to the reset last bit's possible position, performing add, compare and select (ACS) operation on the calculated metric value, and generating metric data; 2) using the generated metric data to find a path selection value at the last bit's possible position; and 3) performing a trace-back from the last bit's possible position to restore data when the found path selection value satisfies the predetermined path selection condition.

The step b) comprises: 1) calculating a parity of the CRC from the restored data; 2) using the calculated parity to determine whether a CRC error occurs in the restored data; 3) calculating the data's SER when it is determined that no CRC error occurs in the restored data; and 4) determining whether the calculated SER satisfies the predetermined SER condition.

The step e) comprises: 1) determining whether the last bit's possible position is the predetermined maximum value; 2) increasing the last bit's possible position by a predetermined value and repeating the steps of a) to d) when the last bit's possible position is not the predetermined maximum value; and 3) setting the last bit's possible position as the last detection position and outputting it when the last bit's possible position is the predetermined maximum value.

In another aspect of the present invention, a blind rate detector in an asynchronous mobile communication system comprises: an add-compare-select (ACS) unit for calculating a branch metric value from input data, performing an ACS operation on the calculated metric value and a path metric value, and generating metric data; a trace-back unit for using the data generated by the ACS unit to trace back to a predetermined length and output relation data; a cyclic redundancy code (CRC) checker for performing a CRC check on the data output from the trace-back unit, and outputting results; a symbol error rate (SER) calculator for calculating the SER of the data output by the trace-back unit; and a controller for controlling the ACS unit, the trace-back unit, the CRC checker, and the SER calculator to determine the blind rate of the input data, and comparing a path selection value at the last bit's possible position and the SER to a predetermined condition and updating the path selection value's minimum value and its corresponding last bit's possible position until the last bit's possible position reaches a predetermined maximum value.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
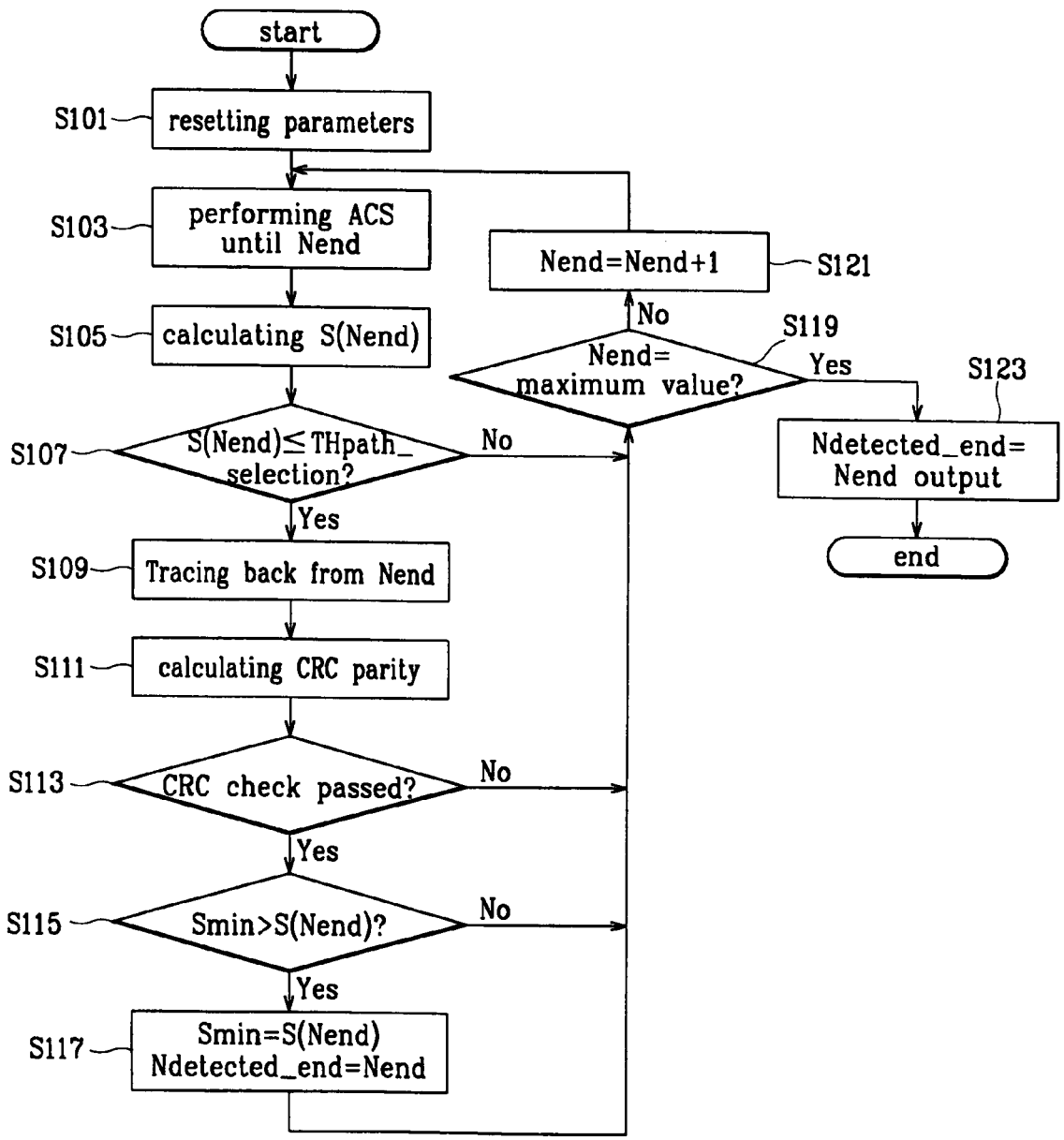
FIG. 1 shows a conventional flowchart of a blind rate detection method of an asynchronous mobile communication system.
Figure 2:
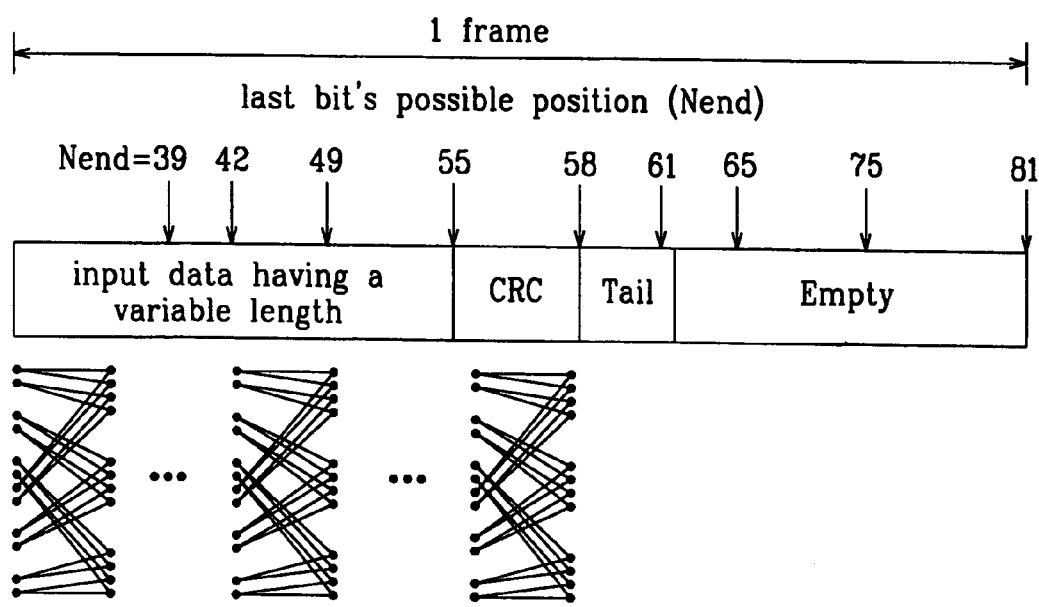
FIG. 2 shows a data structure having a variable length.
Figure 3:
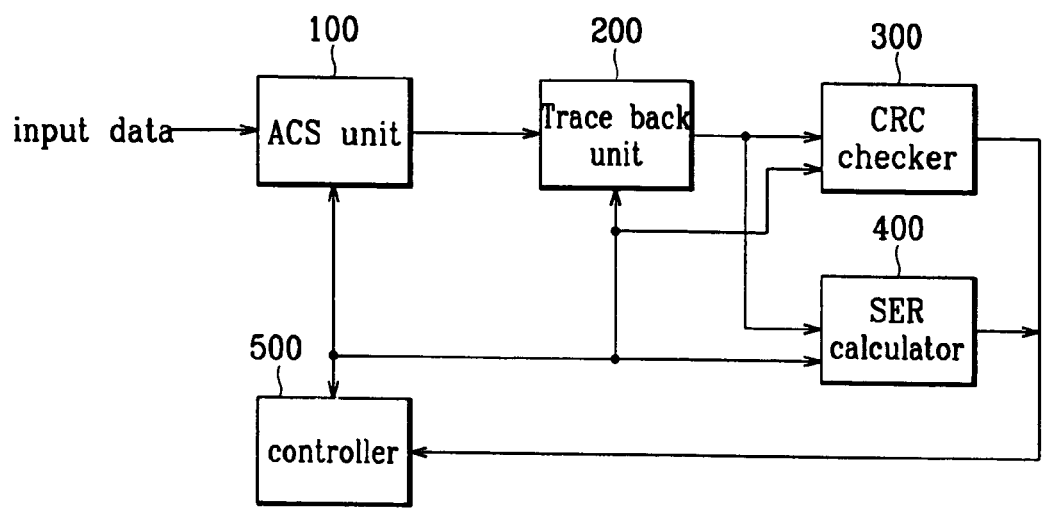
FIG. 3 shows a block diagram of a blind rate detector of an asynchronous mobile communication system according to a preferred embodiment of the present invention.

FIG. 3 shows a block diagram of a blind rate detector of an asynchronous mobile communication system according to a preferred embodiment of the present invention.

As shown, the blind rate detector comprises: an add-compare-select (ACS) unit 100; a trace-back unit 200; a CRC checker 300; a symbol error rate (SER) calculator 400; and a controller 500.

The ACS unit 100 calculates a branch metric value from the variable data stream transmitted from the transmitter, performs an ACS process on the calculated branch metric value and a path metric value, and outputs metric data. The metric data include a maximum path metric value $a_{max}$, a minimum path metric value $a_{min}$, and a path metric value $a_0$ in the 0 state.

The trace-back unit 200 uses the data output from the ACS unit 100 to trace them back to a predetermined length, and outputs data.

The CRC checker 300 performs a CRC check on the data output from the trace-back unit 200, and outputs checking results.

The SER calculator 400 calculates the SER of the data output from the trace-back unit 200, and outputs results.

The controller 500 controls the ACS unit 100, the trace-back unit 200, the CRC checker 300, and the SER calculator 400 to determine the blind rate of the variable data transmitted from the transmitter.

Figure 4:
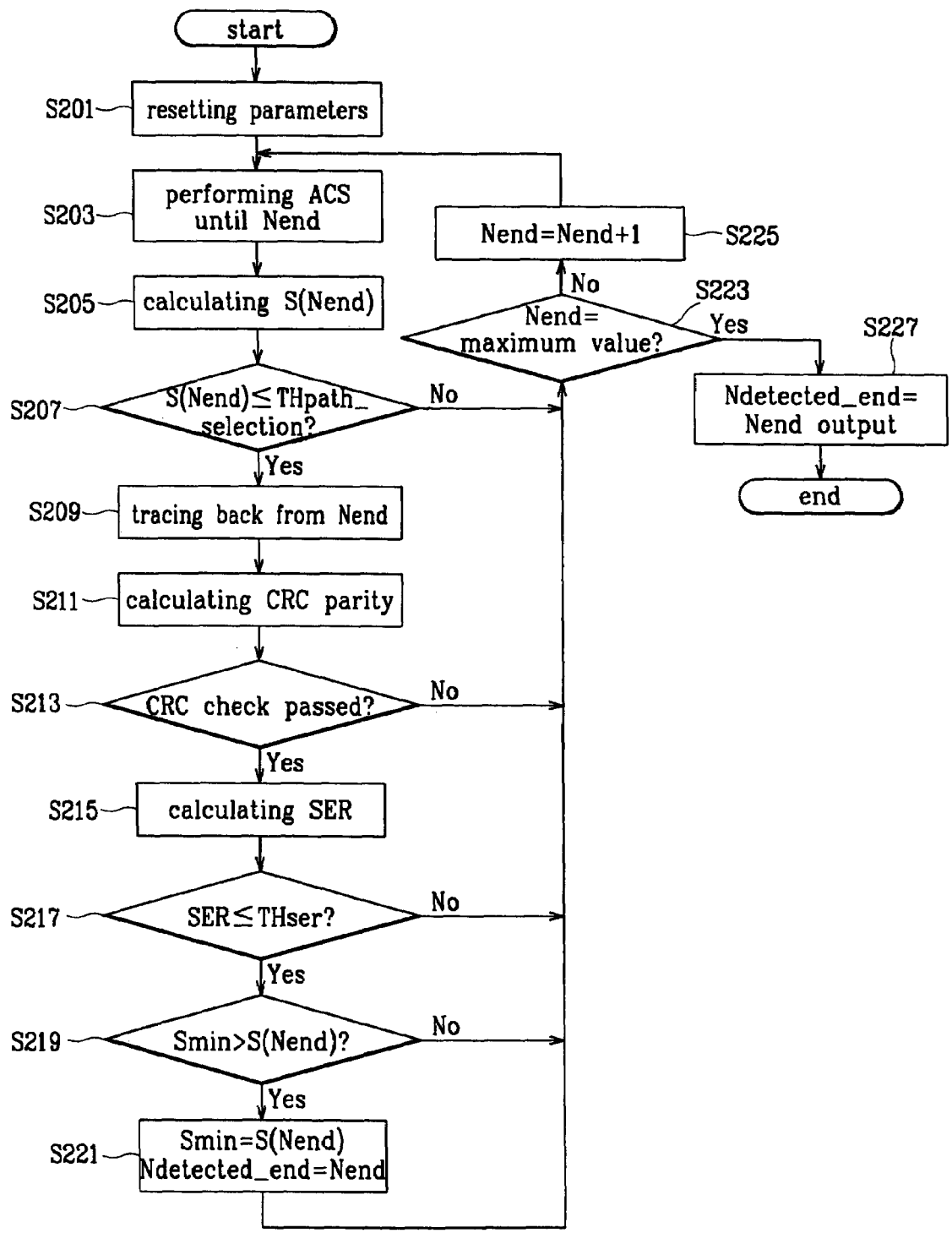
FIG. 4 shows a flowchart of a blind rate detection method of an asynchronous mobile communication system according to the preferred embodiment of the present invention.

Referring to FIG. 4, a blind rate detection method of an asynchronous mobile communication system according to the preferred embodiment of the present invention will now be described in detail.

First, the controller 500 resets various parameters needed for detecting the blind rate in step S201. Here, the parameters include: a last bit's possible position $N_{end}$; a minimum value $S_{min}$ of path selection values; and a last detection position $N_{detected\_end}$. The last bit's possible position $N_{end}$ and the last detection position $N_{detected\_end}$ are reset to be 1, and the minimum value $S_{min}$ of the path selection values is reset to be a path selection threshold value $TH_{path-selection}$ that is previously set as a predetermined value.

Next, the ACS unit 100 performs Viterbi decoding by control of the controller 500 so that an accurate trellis path may be terminated in the 0 state at the last bit's possible position $N_{end}$ in step S203. In this step, the ACS unit 100 calculates branch metric values of the input data, and performs add, compare, and select operations (i.e., ACS) on the calculated metric value to generate a maximum path metric value $a_{max}$, a minimum path metric value $a_{min}$ at the last bit's possible position $N_{end}$, and a path metric value $a_0$ in the 0 state.

Next, the controller 500 uses the parameters generated by the ACS unit 100, that is, the maximum path metric value $a_{max}$, the minimum path metric value $a_{min}$ at the last bit's possible position $N_{end}$, and the path metric value $a_0$ in the 0 state, to find a path selection value $S(N_{end})$ at the last bit's possible position $N_{end}$ by Equation 2 in step S205.

$$S(N_{end}) = \frac{a_0(N_{end}) - a_{min}(N_{end})}{a_{max}(N_{end}) - a_{min}(N_{end})} \qquad \text{Equation 2}$$

By finding the path selection value $S(N_{end})$ at the last bit's possible position $N_{end}$ by Equation 2 and not by a conventional logarithmic function, the hardware is implemented using adders and inverters, thereby reducing hardware complexity.

Next, in order to remove the generation of a detection error, the controller 500 determines whether the path selection value $S(N_{end})$ at the last bit's possible position $N_{end}$ is equal to or less than the path selection threshold value $TH_{path-selection}$ in step S207. That is, according to the path selection threshold value $TH_{path-selection}$, it is determined whether the trellis path connected to the 0 state is to be traced back to the last bit's possible position $N_{end}$.

If the path selection value $S(N_{end})$ fails to satisfy Equation 2, that is, when the path selection value $S(N_{end})$ is greater than the path selection threshold value $TH_{path-selection}$ the controller 500 determines whether the last bit's possible position $N_{end}$ is a maximum value in step S223, and when the last bit's possible position $N_{end}$ is not the maximum value, the controller 500 increases the last bit's possible position $N_{end}$ by 1 in step S225, and repeats the steps S203, S205, S207, and S223 so that the last bit's possible position $N_{end}$ may be the maximum value. Accordingly, when the last bit's possible position $N_{end}$ is the maximum value, the controller 500 outputs the maximum value to the last detection position $N_{detected\_end}$ in step S227, and terminates the blind rate detection process. In this instance, in the step S225, the last bit's possible position $N_{end}$ is increased by 1, but the technical scope of the present invention is not restricted to this, and by setting gaps of the last bit's possible position its increase ranges may be varied.

When the path selection value $S(N_{end})$ satisfies Equation 2 in the step S207, that is, when the path selection value $S(N_{end})$ is less than or equal to the path selection threshold value $TH_{path-selection}$, the controller 500 controls the trace-back unit 200 so that the path may be traced back from the last bit's possible position $N_{end}$, in order to restore frame data in step S209.

Next, the controller 500 controls the CRC checker 300 to calculate the CRC parity from the data restored by the trace-back unit 200 in step S211, and performs a CRC check in step S213.

If a CRC error occurs in the CRC check step S213, the controller 500 executes the step S223, and if no CRC error occurs, the controller 500 controls the SER calculator 400 to calculate the SER of the restored data in step S215.

After this, the controller 500 determines whether the SER calculated in step S215 is less than or equal to the SER's threshold value $TH_{SER}$ in step S217, and if the SER is greater than the SER's threshold value $TH_{SER}$, that is, when the radio channel environment is very bad and is not reliable, the controller 500 executes the step S223.

However, if the SER is less than or equal to the SER's threshold value $TH_{SER}$, that is, when the radio channel environment is good and reliable, the controller 500 determines in step S219 whether the path selection value $S(N_{end})$ at the last bit's possible position $N_{end}$ is less than the minimum value $S_{min}$ of the path selection values reset in the reset step S201.

In this instance, when the path selection value $S(N_{end})$ is equal to or greater than the minimum value $S_{min}$, of the path selection values, the controller 500 executes the step S119, and if the path selection value $S(N_{end})$ is less than the minimum value $S_{min}$ of the path selection values, the controller stores the path selection value $S(N_{end})$ of the last bit's possible position $N_{end}$ as the minimum value $S_{min}$ of the path selection values, stores the last bit's possible position $N_{end}$ as the last detection position $N_{detected\_end}$ in step S221, and executes the step S223.

Since the hardware for finding the path selection value $S(N_{end})$ at the last bit's possible position $N_{end}$ can be implemented by use of adders and inverters according to the present invention, its complexity is greatly reduced.

Further, by performing a CRC check and then comparing SERs, the present invention differently processes the case when the radio channel environment is bad and unreliable and the other case when the radio channel environment is good and reliable, thereby greatly increasing reliability.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A blind rate detection method in an asynchronous mobile communication system comprising:

a) restoring data when a path selection value at a last bit's possible position of a reset last bit satisfies a predetermined path selection condition;

b) determining whether a symbol error rate (SER) of the restored data satisfies a predetermined SER condition when no error occurs in a cyclic redundancy code (CRC) of the restored data;

c) determining whether it is needed to update a minimum value of path selection values when it is determined that the SER satisfies the predetermined SER condition;

d) setting a path selection value of the last bit's possible position as the minimum value of the path selection values and setting the last bit's possible position as a last detection position when it is determined that it is needed to update the minimum value of the path selection values; and e) repeating the steps of a) to d) until the last bit's possible position reaches a predetermined maximum value, and outputting the last detection position when the last bit's possible position becomes the predetermined maximum value.

2. The method of claim 1, wherein a) comprises:
1) calculating a branch metric value up to the reset last bit's possible position, performing add, compare, and select (ACS) operations on the calculated metric value, and generating metric data;
2) using the generated metric data to find a path selection value at the last bit's possible position; and
3) performing a trace-back from the last bit's possible position to restore data when the found path selection value satisfies the predetermined path selection condition.

3. The method of claim 2, wherein the metric data comprise: a maximum path metric value $a_{max}$; a minimum path metric value $a_{min}$; and a path metric value $a.sub.0$ in the 0 state, and a path selection value $S(N_{end})$ at the last bit's possible position $N_{end}$ satisfies a subsequent equation.

$$S(N_{end}) = \frac{a_0(N_{end}) - a_{\min}(N_{end})}{a_{\max}(N_{end}) - a_{\min}(N_{end})}$$

4. The method of claim 3, wherein the predetermined path selection condition determines whether the path selection value at the last bit's possible position is less than a predetermined path selection threshold value.

5. The method of claim 1, wherein b) comprises:
1) calculating a parity of the CRC from the restored data;
2) using the calculated parity to determine whether a CRC error occurs in the restored data;
3) calculating the data's SER when it is determined that no CRC error occurs in the restored data; and
4) determining whether the calculated SER satisfies the predetermined SER condition.

6. The method of claim 5, wherein the predetermined SER condition determines whether the calculated SER is less than the predetermined SER threshold value.

7. The method of claim 1, wherein whether to update the minimum value of the path selection values in c) is determined by determining whether the path selection value is less than a predetermined minimum value.

8. The method of claim 1, wherein e) comprises:
1) determining whether the last bit's possible position is the predetermined maximum value;
2) increasing the last bit's possible position by a predetermined value and repeating the steps of a) to d) when the last bit's possible position is not the predetermined maximum value; and
3) setting the last bit's possible position as the last detection position and outputting it when the last bit's possible position is the predetermined maximum value.

9. A blind rate detector in an asynchronous mobile communication system, comprising:
an add-compare-select (ACS) unit for calculating a branch metric value from input data, performing an ACS operation on the calculated metric value and a path metric value, and generating metric data;
a trace-back unit for using the data generated by the ACS unit to trace back to a predetermined length and output relation data;
a cyclic redundancy code (CRC) checker for performing a CRC check on the data output from the trace-back unit, and outputting results;
a symbol error rate (SER) calculator for calculating the SER of the data output by the trace-back unit; and
a controller for controlling the ACS unit, the trace-back unit, the CRC checker, and the SER calculator to determine the blind rate of the input data, and comparing a path selection value at the last bit's possible position and the SER to a predetermined condition and updating the path selection value's minimum value and its corresponding last bit's possible position until the last bit's possible position reaches a predetermined maximum value.

10. The blind rate detector of claim 9, wherein the metric data generated by the ACS unit comprise: a maximum path metric value $a_{max}$; a minimum path metric value $a_{min}$; and a path metric value $a.sub.0$ in the 0 state, and a path selection value $S(N_{end})$ at the last bit's possible position $N_{end}$ satisfies a subsequent equation.

$$S(N_{end}) = \frac{a_0(N_{end}) - a_{\min}(N_{end})}{a_{\max}(N_{end}) - a_{\min}(N_{end})}$$

11. The blind rate detector of claim 9, wherein the predetermined condition comprises:
a condition for determining whether a path selection value at the last bit's possible position is less than a predetermined path selection threshold value; and
a condition for determining whether the SER is less than a predetermined SER threshold value.

* * * * *